United States Patent [19]

Velasquez

[11] 4,213,477
[45] Jul. 22, 1980

[54] AUTOMATIC DAMPER FOR FURNACE VENT PIPE

[76] Inventor: Robert L. Velasquez, 11422 Minden, Detroit, Mich. 48205

[21] Appl. No.: 11,374

[22] Filed: Feb. 12, 1979

[51] Int. Cl.² ............................................. F16K 13/00
[52] U.S. Cl. ..................................... 137/15; 137/318; 251/305
[58] Field of Search ................... 137/15, 318; 251/305, 251/367; 29/157.1 R

[56] References Cited

U.S. PATENT DOCUMENTS

| 299,172 | 5/1884 | Shaw . | |
|---|---|---|---|
| 411,603 | 9/1889 | Mohrmann . | |
| 698,995 | 4/1902 | McCleary . | |
| 2,571,916 | 10/1951 | McKinley | 137/15 |
| 2,676,604 | 4/1954 | Senna | 251/305 X |
| 3,687,166 | 8/1972 | Herrin | 137/318 X |
| 3,749,108 | 7/1973 | Long | 137/15 |

Primary Examiner—Alan Cohan
Attorney, Agent, or Firm—Harness, Dickey & Pierce

[57] ABSTRACT

An improved automatic damper for furnace vent pipes is disclosed. The damper is part of a mounting mechanism which is installed in an existing furnace vent pipe and attached to a motor for operation of the damper. The motor is secured to a mounting bracket which in turn is secured to a collar mounting bracket which has two sections and is removably secured around the existing vent pipe. One section of the collar mounting bracket has an elongated slot which is used as a template for preparing an access slot in the pipe for the damper. Both of the sections have pilot holes in them which are used to make corresponding pilot holes in the vent pipe. After the slot and pilot holes are prepared, the two sections are removed and the damper is installed in the slot in the vent pipe. Thereafter, the two sections of the collar mounting brackets are reinstalled on the vent pipe, but in opposite positions thereby covering the access slot and securing the damper in place. The motor and thus the operation of the damper is controlled by the operation of the furnace motor.

12 Claims, 7 Drawing Figures

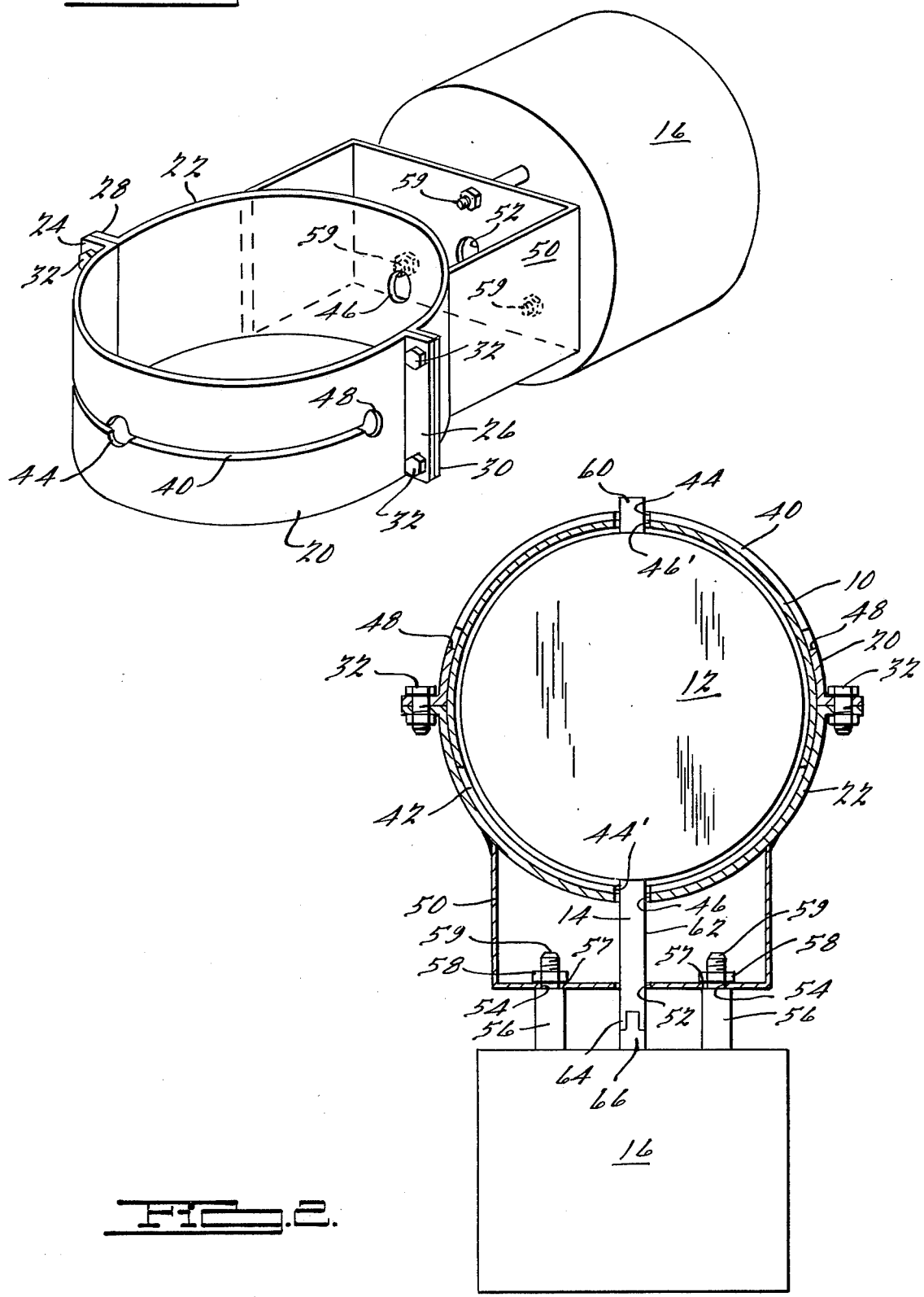

AUTOMATIC DAMPER FOR FURNACE VENT PIPE

BACKGROUND - SUMMARY OF THE INVENTION

The present invention relates to automatically operated energy saving dampers for vent pipes of furnaces or boilers which retain their heat during all cycles and thus conserve fuel. These vent dampers are controlled by a motor which in turn is regulated by the on and off cycle of the furnace or boiler itself. the unit automatically closes off the chimney opening when the furnace is not working and thus prevents heat from the building from escaping into the atmosphere through the open vent. The units are "closed" and thus close off the vent pipe whenever the furnace is not in operation; similarly, the units are "opened" when the furnace is in operation in order to allow the exhaust products to leave the building.

Known energy damper mechanisms today necessitate the removal of a portion of the old vent pipe in order to incorporate the damper into the venting system. This is a difficult, time consuming, costly, and dirty job which in most cases is beyond the skill or ambitions of the average homeowner. Also, when the section of the vent pipe is removed, it is replaced with a new section having the damper already installed in it. The majority of energy dampers are for residential and light commercial uses and the existing furnace and boiler vent pipes are made of thin guage material which is relatively flexible and inadequate for maintaining a damper in position and allowing it to move freely without binding. To overcome these problems, the new section is made of a rigid material, such as steel or cast iron pipe. In either case, the material for the new section of pipe is expensive creating additional cost. Also, it is not possible to inspect, repair and replace the dampers in these known systems without repeating the same messy, laborious and time-consuming process used to install them.

The present invention overcomes the aforementioned problems and provides an improved automatic vent damper mechanism, as well as an improved means for installing and mounting the damper. The invention allows relatively simple and easy installation (or repair and replacement) for the homeowner, as well as the professional, and is less expensive to manufacture and install.

In accordance with the present invention, a pair of unique collar mounting brackets are utilized with a conventional motor and damper. The collar mounting brackets are each semi-circular in shape and are adapted to be installed securely on the outside of an existing vent pipe. One of the mounting brackets has an elongated slot in it which acts as a template or guide for making a corresponding access slot in the vent pipe for installation of the damper. The other collar mounting bracket is connected to a motor bracket on which the electric motor is affixed for automatically operating the damper. Also, both of the collar mounting brackets have pilot holes which are used as guides for drilling corresponding holes in the vent pipe for the damper shaft.

When the section of the vent pipe is selected in which the damper is to be installed, the two collar mounting brackets are fastened circumferentially around it. Then, with conventional tools, such as a hack saw and drill, the pilot holes and vent damper access slot are made in vent pipe using the collar mounting brackets as guides. After the collar mounting brackets are removed, the damper which is mounted on a shaft is then inserted through the newly formed slot in the vent pipe with the ends of the shaft being positioned in the two holes in the pipe. Thereafter, the collar mounting brackets are repositioned around the vent pipe, but 180° out of phase from the manner in which they were positioned when the access slot and holes were made. The holes in the brackets are mated with holes in the pipe and act as bearings for the damper during use. The drive motor is then installed on one of the mounting brackets and a slotted drive coupling or the like is used to connect the motor with the shaft on the damper. Thereafter, the motor is attached to the electric operating circuit of the furnace in a conventional manner so that it will operate when the furnace goes on and off.

BRIEF DESCRIPTION OF THE DRAWINGS

FIG. 1 is a perspective view illustrating the inventive collar mounting brackets;

FIG. 2 is a partial cross-sectional view of the invention installed on a vent pipe.

DESCRIPTION OF THE PREFERRED EMBODIMENT

Figure 3:
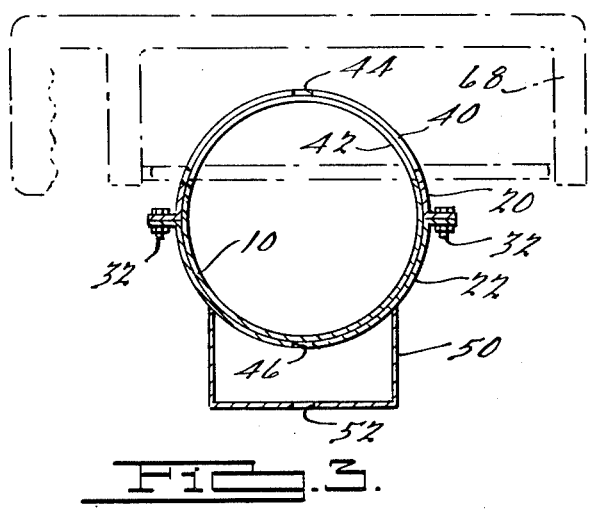
FIGS. 3 through 7 illustrate the manner in which the invention is installed on a vent pipe.

As shown in FIGS. 1 and 2, the present invention is adapted to be installed on a vent pipe 10 of a furnace, boiler, heating unit, or the like. The vent pipe goes from the furnace to the chimney of the building and vents the furnace exhaust gases to the outside atmosphere. A damper 12 is installed in the center of the vent pipe 10 and is connected by a shaft 14 to a motor 16. The motor 16 in turn is connected in any conventional manner to the electrical system of the furnace so that it operates in unison with the operation of the furnace.

A pair of collar mounting brackets 20 and 22 are substantially semi-circular in shape and are adapted to fit around the circumference of the vent pipe 10 to form a complete circle. The bracket 20 has a pair of outwardly directed flanges 24 and 26 which mate with corresponding flanges 28 and 30 on the bracket 22. The flanges 24, 26, 28, and 30 extend radially outwardly from the center of the vent pipe 10 when the brackets 20 and 22 are installed in place around the outside thereof. The brackets 20 and 22 are held securely in place encompassing the pipe 10 by nuts and bolts 32 which are positioned through mating holes in the flanges 24, 26, 28, and 30. It is understood, of course, that any conventional fastening means can be used to fasten the brackets 20 and 22 together without departing from the spirit or scope of the present invention.

As best shown in FIG. 1, the bracket 20 has an elongated slot 40 approximately in the longitudinal center thereof. The slot 40 acts as a guide or template for making a corresponding access slot 42 in the vent pipe 10 as will be described below. Apertures 48 are provided at each of the ends of the slot 40 to act as "stops" or limits for the cutting of the access slot 42. The bracket 20 also has a pilot hole 44 approximately in the center thereof which is used to position and mount the damper 12 in place, also as described below. The bracket 22 has a similar pilot hole 46 which is used for the same purpose. When the brackets are mounted on the pipe 10, holes 44' and 46' are formed (drilled) through the pipe 10 using the pilot holes 44 and 46, respectively, as guides. The holes 44 and 46, in the brackets, together with the holes 44' and 46', act as bushings for the damper shaft 14 in order to allow the damper 12 to rotate (open and close) in the vent.

A motor bracket 50 is secured to the outside of the bracket 22. The brackets 20 and 22 are preferably made of sheet metal or a similar material which can be molded and will retain its integrity and shape in use. The motor bracket 50 similary is made from the same material. The motor bracket 50 is preferably permanently attached to the bracket 22, as by welding. The bracket 50 has a hole 52 in it which is in axial alignment with pilot holes 44 and 46. A plurality of holes 54 are also provided in the bracket 50 and used to mount the motor 16 to the brackets 20 and 22. The number of holes 54 which are provided depend on the number of engine mounting posts 56 provided on the motor 16. In the preferred embodiment, three holes and posts are provided. The posts 56 have collars 57 for accurately positioning the motor on the bracket 50. The motor is attached to the bracket 50 by nuts 58 which are fastened on the threaded ends 59 of the posts 56.

The damper 12 is attached to a shaft 14 which protrudes from both ends of the damper. At one end, a short segment 60 protrudes beyond the damper and is inserted through pilot hole 44 in bracket 20 and hole 46' in the vent pipe 10. On the other end, shaft 14 has a longer segment 62 which is positioned through hole 44' in the vent pipe 10, pilot hole 46 in bracket 22, and in turn through hole 52 in bracket 50. The end of the shaft 14 is connected by a slotted drive coupling 64 to a short drive shaft 66 protruding from the motor 16. Thus, when the damper 12 and shaft 14 are installed in place in the pipe 10 and attached to the motor 16, as shown in FIG. 2, the operation of the motor in accordance with the sequential operation of the furnace (not shown) will operate the damper and thus automatically open and close the chimney opening to prevent warm air from escaping when the furnace is not working.

The installation of the collar mounting brackets and motor on the vent pipe 10 are shown in FIGS. 3 through 7. As shown in FIG. 3, the brackets 20 and 22 are first installed in place around the vent pipe 10 in the position where the final installation will be made. After the bolts 32 are tightened locking the brackets 20 and 22 on the pipe, a hack saw 68 is positioned in the slot 40 and utilized to cut the circumferential access slot 42. As discussed below, the access slot 42 is later used for inserting the damper 12 in position inside the vent pipe 10.

Figure 4:
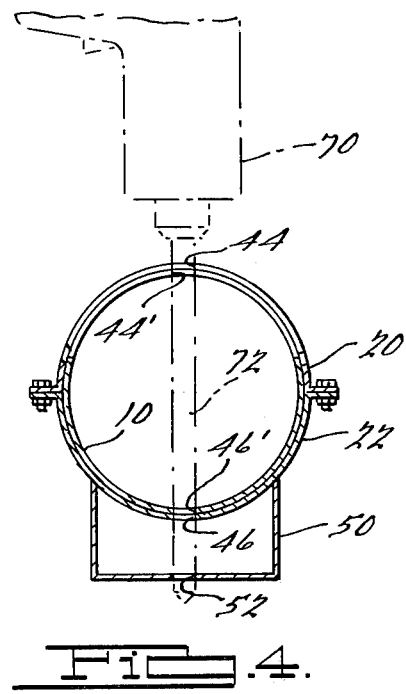

With the brackets 20 and 22 still in place, holes 44' and 46' are drilled in the vent pipe 10, as shown in FIG. 4. The holes 44' and 46' can be formed in any conventional means, such as by use of drill 70 and bit 72. The pilot holes 44 and 46 are utilized for this purpose. It is possible to use one large bit 72 as shown, or use a shorter bit and drill the holes from both sides. Also, it is understood that the steps shown in FIGS. 3 and 4 can be reversed, that is, the holes 44' and 46' can be drilled prior to cutting slot 42.

Figure 5:
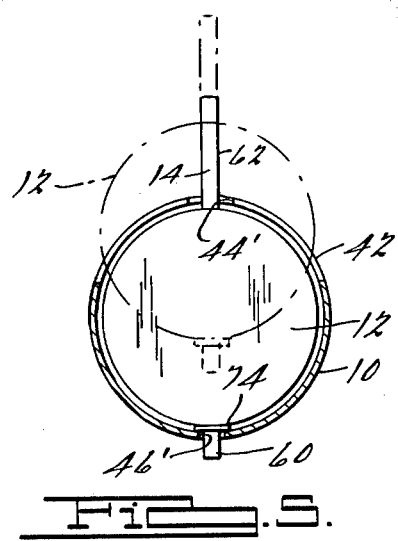
Figure 6:
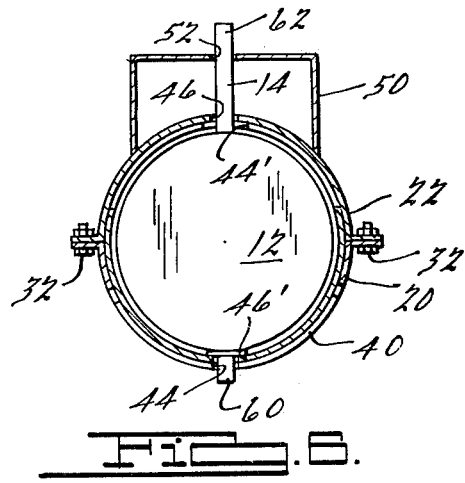

After the slot 42 and holes 44' and 46' are made in the vent pipe 10, the brackets 20 and 22 are removed. Then, damper 12 is positioned through the access slot 42 into the center of the vent pipe 10, as shown in FIG. 5. A clearance space on the order of one-eighth of an inch is left between the outer edge of the damper 12 and the inside surface of the pipe 10. When the damper is installed in the pipe, the end portion 60 of the shaft 14 is positioned in hole 46' while the other end portion 62 of the shaft 14 is left protruding from the opposite hole 44'. Preferably, a washer or bushing 74 is provided on the end portion 60 of the shaft 14 in order to space the damper 12 from the inside of the vent pipe 10 and thus prevent the damper from rubbing or failing to operate. When bushing 74 is utilized, the hole 44' in the vent pipe 10 is enlarged sufficient (by the use of tinsnips or the like) so that the bushing 74 can be passed through it to the position shown in FIG. 5. If desired, a second bushing (not shown) can be provided on the other end portion 62 of the shaft.

After the damper 12 is installed in position in the vent pipe 10, the brackets 20 and 22 are again installed in place and secured by bolts 32. In this instance, however, the positions of brackets 20 and 22 on the pipe 10 are reversed, that is, they are positioned 180° out of phase from the manner in which they were installed relative to forming the slot 42 and holes 44' and 46'. Thus, pilot hole 44 on bracket 20 is now positioned immediately adjacent hole 46' while pilot hole 46 on bracket 22 is positioned immediately adjacent hole 44'. Also, as is apparent, the bracket 20 is positioned such that the hole 44 is positioned over the end 60 of the shaft 14 while bracket 22 is positioned such that holes 46 and 52 are positioned over the end 62 of shaft 14. When the bolts 32 are tightened, the brackets 20 and 22 will self align with the damper 12 and shaft 14 to allow proper clearance for rotation of the damper within the pipe 10. The holes 44, 44', 46 and 46', particularly the pilot holes in the rigid brackets, act as bearings or bushings for the damper shaft.

When the brackets 20 and 22 are reversed on the vent pipe 10, the elongated access slot 42 in the vent pipe is covered by the solid bracket 22 while the open slot 40 on bracket 20 is positioned harmlessly out of place on the opposite side of the pipe. If the slot 40 was to remain in position over the slot 42, potentially dangerous exhaust products and pollution from the furnace, as well as unwanted sooty grime, would be released into the atmosphere inside the building.

Figure 7:
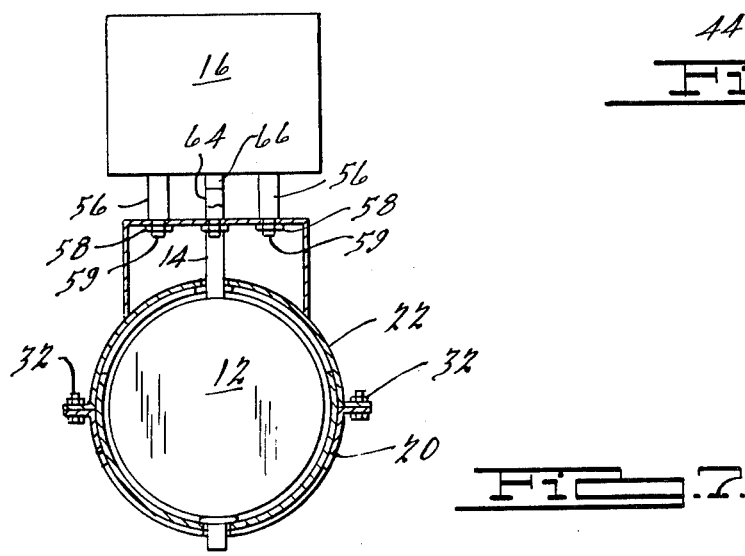

As shown in FIG. 7, the motor 16 is installed on the motor bracket 50 as a final step in the installation. The slotted drive coupling 64 is linked between the damper shaft 12 and the motor shaft 66 and the nuts 58 are secured in place on the ends 59 of the posts 56. The motor 16 can be of any conventional type which is used as a drive motor for known automatic vent damper systems. One of the motors that can be used is that associated with the Effikal Automatic Damper System. After the motor 16 is installed in place, it is wired electrically in circuit with the furnace electrical system, as is conventionally known. Thereafter, when the furnace boiler heating unit thermostat signals the furnace for more heat, the motor 16 will automatically turn the vent 12 parallel to the flow of gas in the vent pipe 10 and open it. With the damper open, the heating system will begin its firing cycle, supply heat to the house, and exhaust the by-products to the atmosphere through the vent pipe and chimney. Later, after the thermostat is satisfied and the burner shut off, the motor will be activated and return the damper to the "closed" position. The automatic vent damper system conserves energy and prevents warm air from the building from escaping up the chimney when the furnace is not in use; it is estimated that known systems save up to 24% of a building or residence's total heating fuel usage.

Through the use of the present invention, it is not necessary to remove a section of the vent pipe in installing an automatic vent damper system. This has a number of advantages and benefits. For example, a homeowner as well as a professional can install the inventive automatic system with minimal effort or expense. Furnace vent pipes are notoriously filthy and the removal of a section thereof usually creates an extremely dirty situation which is difficult to clean up due to the greasy dirt which is usually contained in such pipes. Also, it is apparent that the section of the vent pipe in which the damper is to be positioned must be relatively true in size so that the damper does not bind it. This is the reason that conventional damper systems utilize a section of stainless steel or cast iron pipe to replace the removed section. Stainless steel is very expensive, however, and a sufficient length of vent pipe or one of sufficient diameter for a large commercial installation is very expensive. If a damper were installed in any conventional system which utilized the same vent pipe without the present invention, a possible hang-up of the damper could occur causing a short of the drive motor and not allow the products of combustion to exhaust to the atmosphere. This could create an unhealthy and dangerous situation. By use of the present invention, however, the collar mounting brackets form a rigid ring around the vent pipe in the area of the damper preventing possible hang-ups.

Also, with use of the present invention, it is much simpler, easier and less expensive to inspect, repair and replace a damper inside a vent pipe. In contrast, with conventional systems, the dirty, time-consuming and laborious process of removing a section of the vent pipe must be repeated in order to inspect the damper, or repair or replace it.

While it will be apparent that the preferred embodiment illustrated herein is well calculated to fulfill the objects above stated, it will be appreciated that the present invention is susceptible to modification, variation, and change without departing from the scope of the invention, as defined by the following claims.

I claim:

1. An automatic damper mechanism for a vent pipe comprising
   a damper positioned in said vent pipe and having a shaft attached thereto rotably positioned in shaft openings in said vent pipe,
   a motor connected to said shaft and adapted to operate said damper, and
   a collar mounting bracket comprised of a first section and a second section which are positioned around said vent pipe forming a ring,
   said first section having an elongated slot therein which is utilized as a template for making a corresponding slot in said vent pipe in order to position said damper therein,
   said section section positioned on said vent pipe covering said slot therein which was used to insert the damper, and
   mounting means on said second section for mounting said motor thereon.

2. The invention as set forth in claim 1 wherein said first section and said second section each have pilot holes therein which are used for making said shaft openings.

3. The invention as set forth in claim 1 wherein said slot in said first section has enlarged openings at its ends which act as stops in the making of said corresponding slot in said vent pipe.

4. The invention as set forth in claim 2 wherein said pilot holes and said shaft openings act as bushings for mounting and rotation of said damper.

5. The invention as set forth in claim 1 wherein said mounting means has an opening therein which is in axial alignment with said shaft openings and through which said shaft is positioned.

6. The invention as set forth in claim 1 wherein a slotted drive coupling connects said motor to said shaft.

7. The invention as set forth in claim 1 wherein said first section and said second section have corresponding mating flanges thereon and said first and second sections are securely fastened at said flanges to form said collar mounting bracket around said vent pipe.

8. A damper mechanism for a vent pipe comprising
   a damper positioned in said vent pipe and having a shaft attached thereto rotatably positioned in shaft openings in said vent pipe, and
   a collar mounting bracket comprised of a first section and a second section which are positioned around said vent pipe forming a ring,
   said first section having an elongated slot therein which is utilized as a template for making a corresponding slot in said vent pipe in order to position said damper therein,
   said second section positioned on said vent pipe in such manner to cover said slot therein which was used to insert the damper,
   said first section and said second section each have pilot holes therein which are used for making said shaft openings.

9. The invention as set forth in claim 8 further comprising a motor connected to said shaft and a motor mount on said second section, said motor positioned on said motor mount.

10. A method for installing a damper in an existing vent pipe without removing any portion of said vent pipe, said method comprising,
   (a) fastening a collar mounting bracket around said vent pipe in the position where a damper is to be installed, said bracket comprised of first and second detachable sections, said first section having a first elongated slot therein,
   (b) making a second elongated slot in said vent pipe using said first elongated slot as a template,
   (c) removing said collar mounting bracket from said vent pipe,
   (d) inserting a damper into said vent pipe through said second elongated slot, said damper mounted on a shaft, and
   (e) refastening said collar mounting bracket on said vent pipe with said second section covering said second elongated slot.

11. A method for installing an automatic damper mechanism on an existing vent pipe without removing said vent pipe or a section thereof, said method comprising
   (a) fastening a collar mounting bracket around said vent pipe in the position where a damper is to be installed, said bracket comprised of first and second detachable sections, said first section having a first elongated slot therein,
   (b) making a second elongated slot in said vent pipe using said first elongated slot as a template,
   (c) removing said collar mounting bracket from said vent pipe, (d) inserting a damper into said vent pipe through said second elongated slot, said damper mounted on a shaft,
(e) refastening said collar mounting bracket on said vent pipe with said second section being positioned over and covering said second elongated slot,
(f) connecting a motor to said shaft for operation of said damper.

12. A method for installing an automatic damper mechanism on an existing vent pipe without removing said vent pipe or a section thereof, said method comprising
(a) fastening a collar mounting bracket circumferentially around said vent pipe in the position where a damper is to be installed, said bracket comprised of first and second detachable sections, said first section having a first elongated slot therein and a first pilot hole positioned in the center of said slot, said second section having a second pilot hole in axial alignment with said first pilot hole,
(b) making a second elongated slot in said vent pipe using said first elongated slot as a template,
(c) making two openings in said vent pipe using said first and second pilot holes as guides,
(d) removing said collar mounting bracket from said vent pipe,
(e) inserting a damper into said vent pipe through said second elongated slot, said damper mounted on a shaft, the ends of said shaft being positioned in said two openings,
(f) refastening said collar mounting bracket on said vent pipe with said second section being positioned over and covering said second elongated slot and said first pilot hole and said second pilot hole being positioned over the ends of said shaft,
(g) connecting a motor to said shaft for operation of said damper.

* * * * *

UNITED STATES PATENT AND TRADEMARK OFFICE
CERTIFICATE OF CORRECTION

PATENT NO. : 4,213,477
DATED : 7/22/80
INVENTOR(S) : Robert L. Velasquez

It is certified that error appears in the above-identified patent and that said Letters Patent are hereby corrected as shown below:

Column 1, line 12: "the" should be --The--

Column 5, line 47: "rotably" should be --rotatably--

Column 5, line 57: "section section" should be -- second section--

Signed and Sealed this

Twenty-eighth Day of October 1980

[SEAL]

Attest:

SIDNEY A. DIAMOND

Attesting Officer

Commissioner of Patents and Trademarks